United States Patent
Song et al.

(10) Patent No.: US 10,676,235 B1
(45) Date of Patent: Jun. 9, 2020

(54) FOLDING BOX

(71) Applicants: Jae Ho Song, Yongin-si (KR); Won Seok Song, Yongin-si (KR); Bo Kyoung Song, Suwon-si (KR)

(72) Inventors: Jae Ho Song, Yongin-si (KR); Won Seok Song, Yongin-si (KR); Bo Kyoung Song, Suwon-si (KR)

( * ) Notice: Subject to any disclaimer, the term of this patent is extended or adjusted under 35 U.S.C. 154(b) by 0 days.

(21) Appl. No.: 16/268,769

(22) Filed: Feb. 6, 2019

(30) Foreign Application Priority Data

Nov. 22, 2018 (KR) .................. 10-2018-0145124

(51) Int. Cl.
*B62B 1/12* (2006.01)
*B65D 6/18* (2006.01)
*B65D 6/24* (2006.01)
*B65D 25/30* (2006.01)
*B65D 6/34* (2006.01)

(52) U.S. Cl.
CPC ............ *B65D 11/1853* (2013.01); *B62B 1/12* (2013.01); *B65D 11/1873* (2013.01); *B65D 11/22* (2013.01); *B65D 25/30* (2013.01)

(58) Field of Classification Search
CPC .............................. B62D 11/1853; B62B 1/12
See application file for complete search history.

(56) References Cited

U.S. PATENT DOCUMENTS

| 1,683,029 | A | * | 9/1928 | Fanger | .................. | B62B 5/0083 |
| | | | | | | 280/651 |
| 3,092,395 | A | * | 6/1963 | Mitty | ........................ | B62B 1/12 |
| | | | | | | 280/652 |
| 3,135,527 | A | * | 6/1964 | Knapp | ....................... | B62B 1/12 |
| | | | | | | 280/654 |
| 3,492,016 | A | * | 1/1970 | O'Connor | ............... | B60B 37/10 |
| | | | | | | 280/47.26 |
| 5,711,438 | A | * | 1/1998 | Smith | ...................... | A47F 5/116 |
| | | | | | | 211/149 |
| 6,253,943 | B1 | * | 7/2001 | Spykerman | ............... | B60R 7/02 |
| | | | | | | 220/6 |
| 6,955,365 | B2 | * | 10/2005 | Giampavolo | ............. | B62B 1/12 |
| | | | | | | 229/117.09 |
| 7,726,671 | B2 | * | 6/2010 | Musi | ...................... | B65D 31/10 |
| | | | | | | 280/37 |
| D625,895 | S | * | 10/2010 | Musi | .............................. | D34/24 |

(Continued)

FOREIGN PATENT DOCUMENTS

KR  101179611 B1  9/2012
KR  20150011668 A  2/2015

*Primary Examiner* — Brian L Swenson
(74) *Attorney, Agent, or Firm* — Egbert, McDaniel & Swartz, PLLC

(57) ABSTRACT

A folding box that can be folded and unfolded easily and increases convenience in use, the folding box includes: a bottom part folded inward by at least one bottom folding means; a front side part connected to a front side of the bottom part; a rear side part connected to a rear side of the bottom part; a left side part connected to a left side of the bottom part, and folded inward by at least one left folding means; and a right side part connected to a right side of the bottom part, and folded inward by at least one right folding means, the left side part and the right side part each have a soft flexible side, so as to fold the bottom part inward when the left side part and the right side part are folded inward.

7 Claims, 15 Drawing Sheets

(56) References Cited

U.S. PATENT DOCUMENTS

| | | | |
|---|---|---|---|
| 8,439,374 B1* | 5/2013 | Elden | B62B 1/12 |
| | | | 280/47.26 |
| 10,376,030 B1* | 8/2019 | Koh | A45C 13/385 |
| 2003/0011173 A1* | 1/2003 | Shall | A01K 97/22 |
| | | | 280/651 |
| 2003/0034636 A1* | 2/2003 | Ng | A45C 5/14 |
| | | | 280/652 |
| 2014/0117072 A1* | 5/2014 | Cullen | B65D 11/1853 |
| | | | 229/117.05 |
| 2014/0151172 A1* | 6/2014 | Diaz | A45C 3/04 |
| | | | 190/1 |
| 2017/0001654 A1* | 1/2017 | Obrien | B62B 1/12 |

* cited by examiner

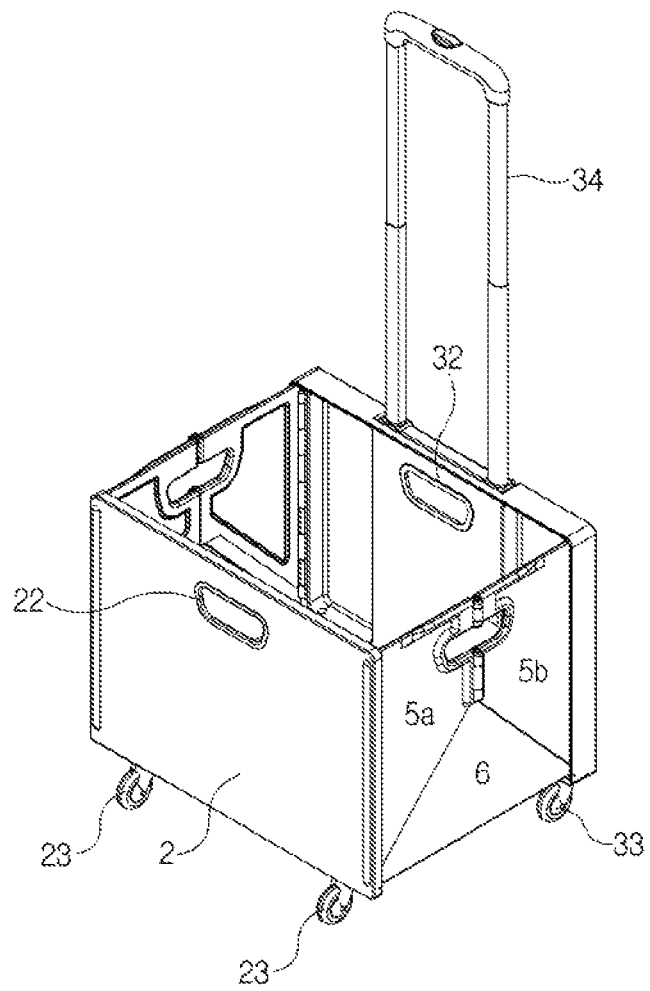

FOLDING BOX

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates generally to a folding box and, more particularly, to a folding box which has a space for storing items therein and which can be folded and unfolded to minimize volume of the folding box.

2. Description of Related Art Including Information Disclosed Under 37 CFR 1.97 and 37 CFR 1.98

Generally, boxes, which are made of synthetic resin and required to be cushioned, lightweight, and impact resistant, are mainly used to transport or store items repeatedly without separate cushioning materials and each have an inside space for storing the items.

Such a storage box requires a storage space equal to volume of the storage box, when the storage box stores the items therein.

However, in the case of an empty box, a space for storing the empty box without the items to be stored is needed, so the space is wasted for storing the empty box, and portability of the box is reduced, which cause a problem of inconvenience.

Here, there is Korean Patent No. 10-1179611 entitled "Packing box of foldable foam plastic". In this case, when a packing box is stored or carried without the items to be stored therein, a method of folding a box body by pressing a folding part provided on the box body from outside to inside after separating an upper cover and a lower cover from the box body is disclosed.

However, in order to fold the box body, the upper cover and the lower cover should be separated from the box body in advance, thus the packing box is inconvenient to use.

In addition, another example is disclosed in Korean Patent Application Publication No. 10-2015-0011668 entitled "Folding type packing box". In this case, when a packing box is stored or carried without storing the items inside the packing box, volume of the box is reduced by only folding side parts sequentially toward a bottom part in a state of opening an upper covering member, which causes a problem of inconvenience.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-1179611 (Sep. 4, 2012); and (Patent Document 2) Korean Patent Application Publication No. 10-2015-0011668 (Feb. 2, 2015).

BRIEF SUMMARY OF THE INVENTION

Accordingly, the present invention has been made keeping in mind the above problems occurring in the related art, and the present invention is intended to propose a folding box, in which a soft flexible side part is provided on each of a left side part and a right side part of the folding box, thereby allowing the box to be easily folded and unfolded, and maximizing convenience in use of the box.

According to one aspect of the present invention, there is provided a folding box, including: a bottom part folded inward by at least one bottom folding means; a front side part connected to a front side of the bottom part; a rear side part 3 connected to a rear side of the bottom part; a left side part connected to a left side of the bottom part, and folded inward by at least one left folding means; and a right side part connected to a right side of the bottom part, and folded inward by at least one right folding means, wherein the left side part and the right side part each have a flexible side part made of a soft material, which is located at a lower area of folding means on left and right sides and allows the bottom part to be folded inward when the left side part and the right side part are folded inward.

According to an embodiment of the present invention, the left side part may have a first left side panel and a second left side panel that are connected to each other by the left folding means and folded inward, the right side part may have a first right side panel and a second right side panel that are connected to each other by the right folding means and folded inward, and the bottom part may have a first bottom panel and a second bottom panel that are connected to each other by the bottom folding means and folded inward by the flexible side part when the left side part and the right side part are folded inward.

According to an embodiment of the present invention, the flexible side part of the folding box is formed in a triangular shape, and the first left side panel, the second left side panel, the first right side panel, and the second side panel may be formed in a trapezoidal shape.

According to the embodiment of the present invention, the bottom folding means, the left folding means, and the right folding means of the folding box may be configured as hinges.

According to the embodiment of the present invention, each of the left folding means and the right folding means may be provided with a left hinge magnet and a right hinge magnet, respectively, for keeping a state in which the left side part and the right side part are unfolded.

According to the embodiment of the present invention, the bottom folding means may have a bottom hinge spring and a spring case for providing elastic force to the bottom folding means when the bottom part is folded inward.

According to another embodiment of the present invention, at a lower side of the rear side part, one or more rear wheels may be provided for moving the folding box.

According to still another embodiment of the present invention, at a lower side of the front side part, one or more front wheels may be provided for moving the folding box.

In the case of the present invention, since the flexible side part is provided on the left side part and the right side part, the folding box can be easily folded or unfolded. Therefore, there is effect in which convenience in use is maximized.

BRIEF DESCRIPTION OF THE SEVERAL VIEWS OF THE DRAWINGS

The above and other items, features and other advantages of the present invention will be more clearly understood from the following detailed description when taken in conjunction with the accompanying drawings, in which:

FIGS. 13 to 15 are perspective views showing folding boxes according to further embodiments of the present invention.

DETAILED DESCRIPTION OF THE INVENTION

In the following description, it is to be noted that, when the functions of conventional elements and the detailed description of elements related with the present invention may make the gist of the present invention unclear, a detailed description of those elements will be omitted. In addition, the numbers used in the description of the present specification are merely an identifier for distinguishing one component from another.

In addition, all terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, specific structural and functional descriptions of embodiments of the present invention disclosed herein are only for illustrative purposes of the preferred embodiments of the present invention, and the present description is not intended to represent all of the technical spirit of the present invention. On the contrary, the present invention is intended to cover not only the exemplary embodiments, but also various alternatives, modifications, equivalents and other embodiments that may be included within the spirit and scope of the present invention as defined by the appended claims.

Exemplary embodiments of the present invention will be described in detail, but when the functions of conventional elements and the detailed description of elements related with the present invention may make the gist of the present invention unclear, a detailed description of those elements will be omitted or compressed.

Figure 1:
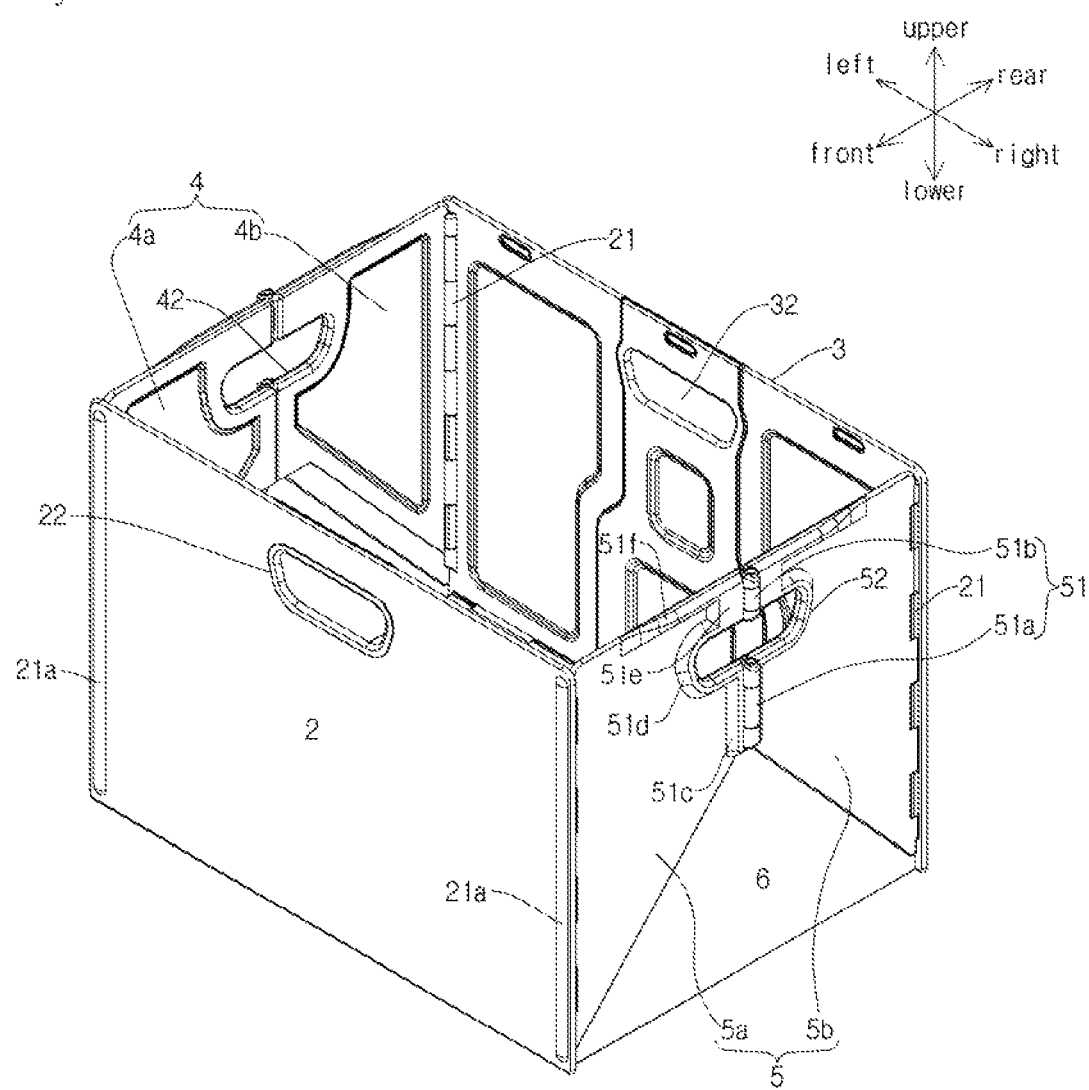
FIGS. 1 to 3 are perspective views showing a folding box according to an embodiment of the present invention.
Figure 2:
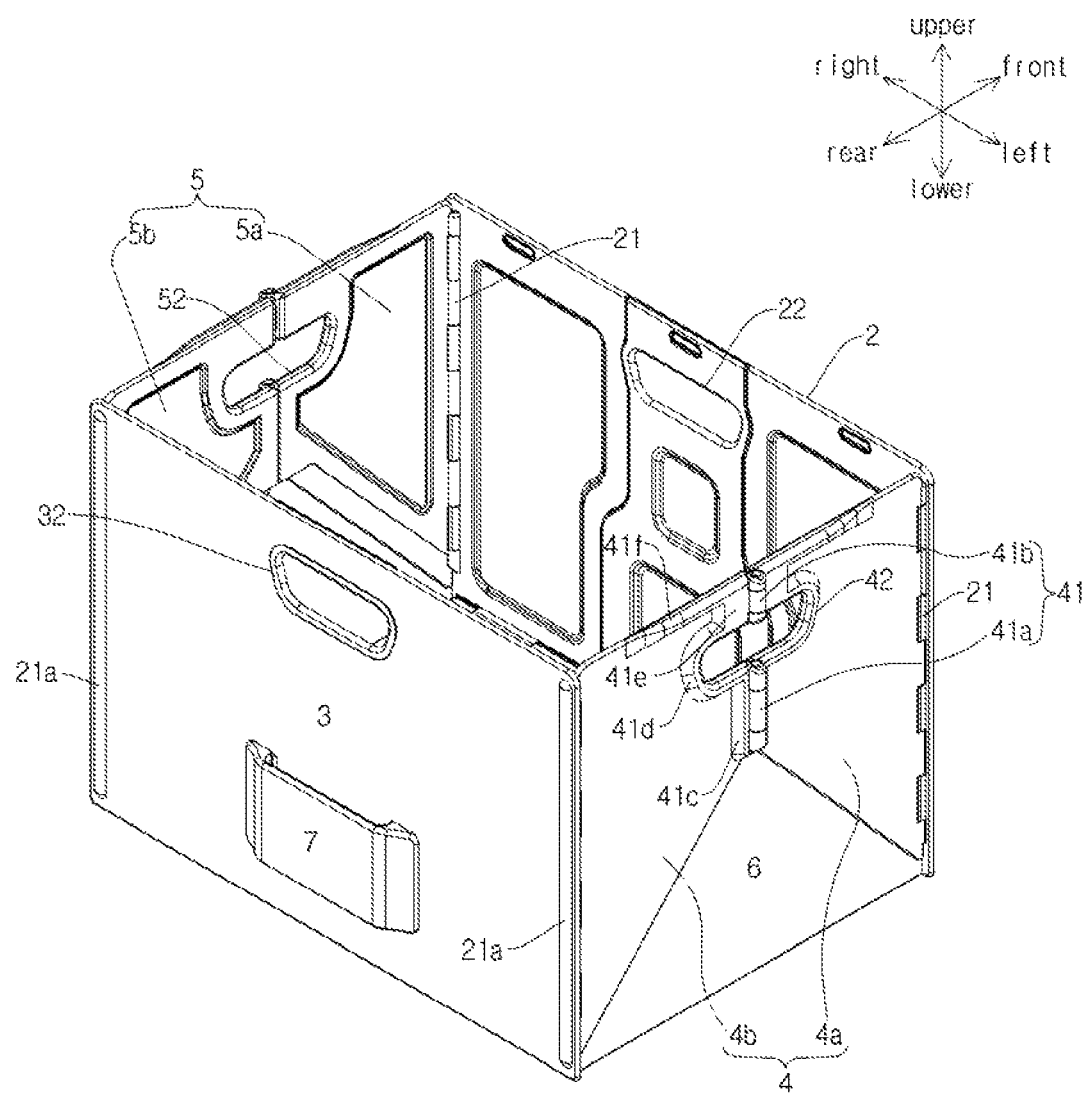
Figure 3:
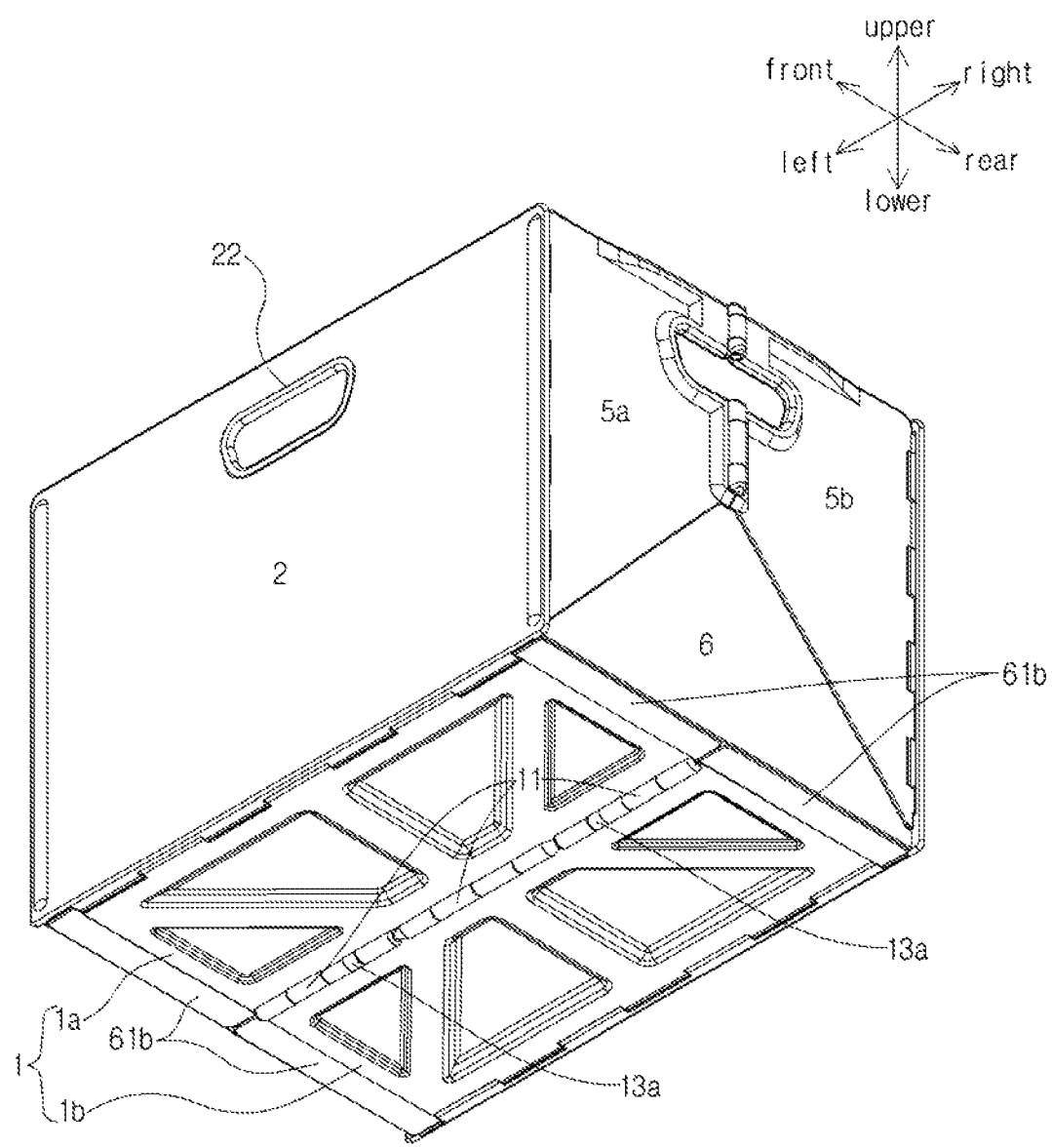
Figure 4:
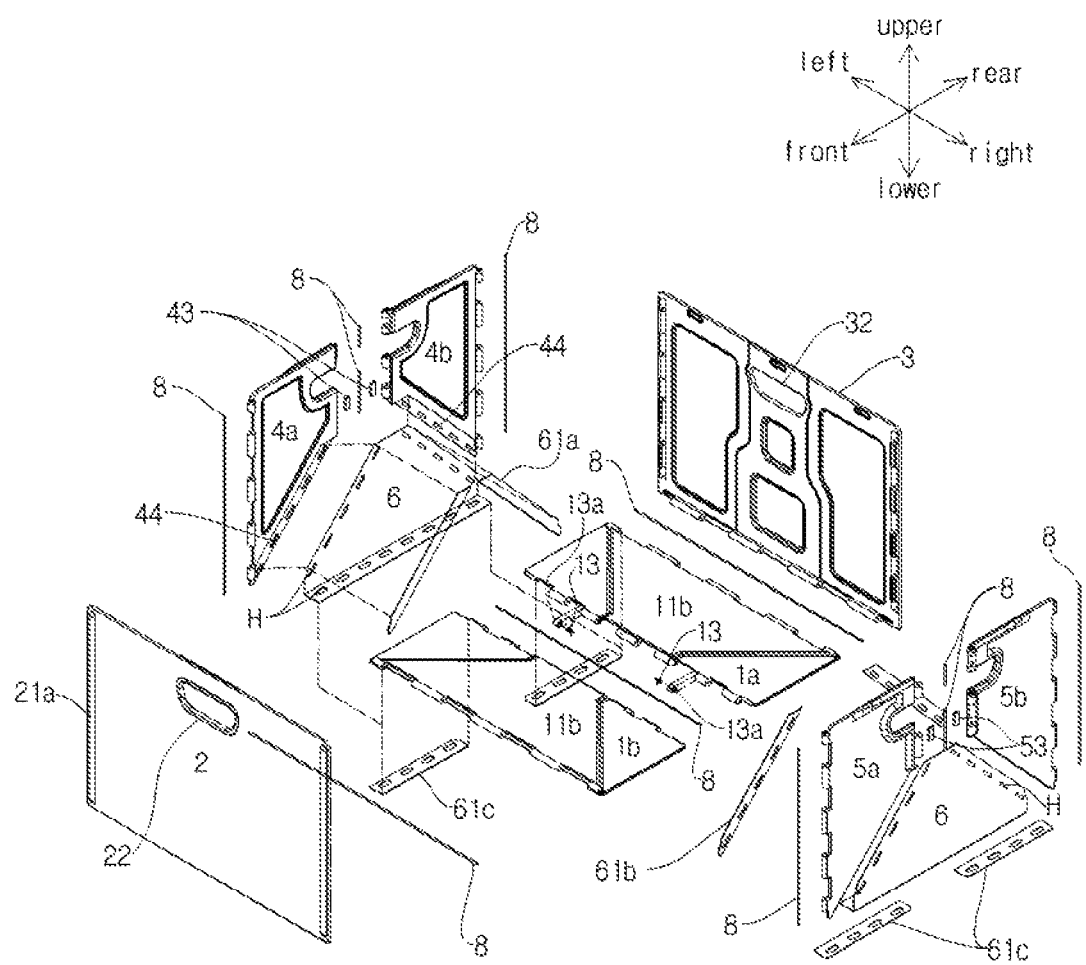
FIG. 4 is an exploded perspective view showing the folding box according to the embodiment of the present invention.
Figure 5:
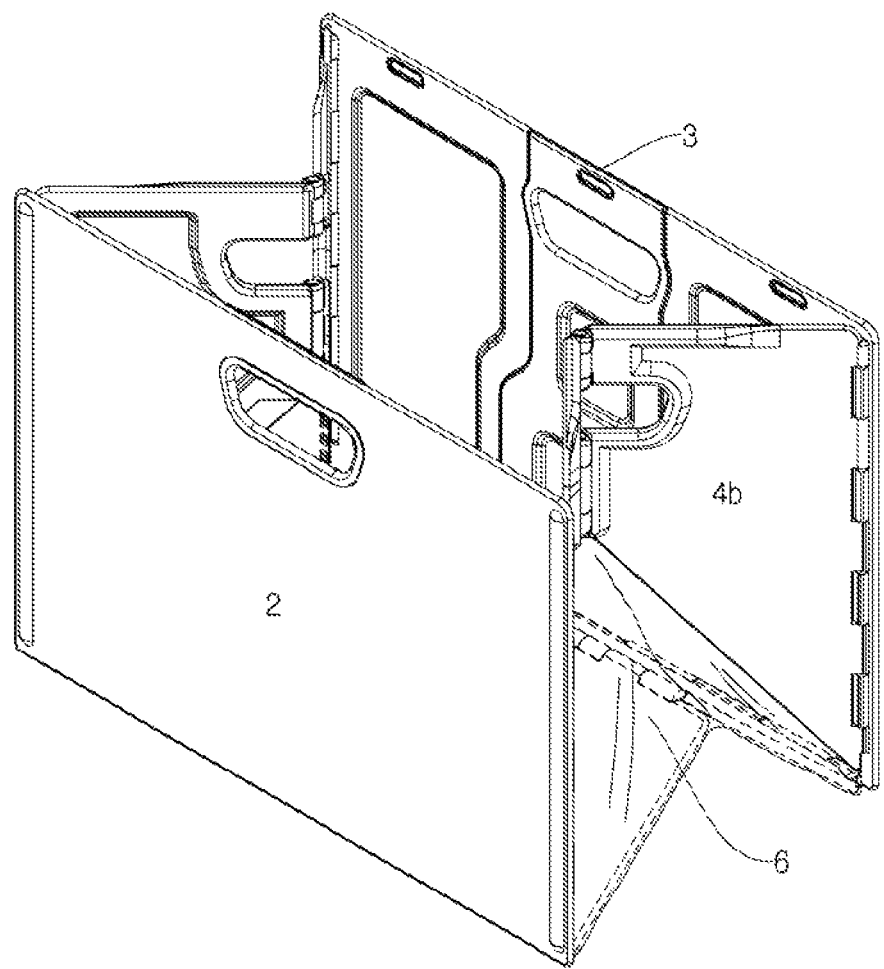
FIG. 5 is a perspective view showing a folding process of the folding box according to the embodiment of the present invention.
Figure 6:
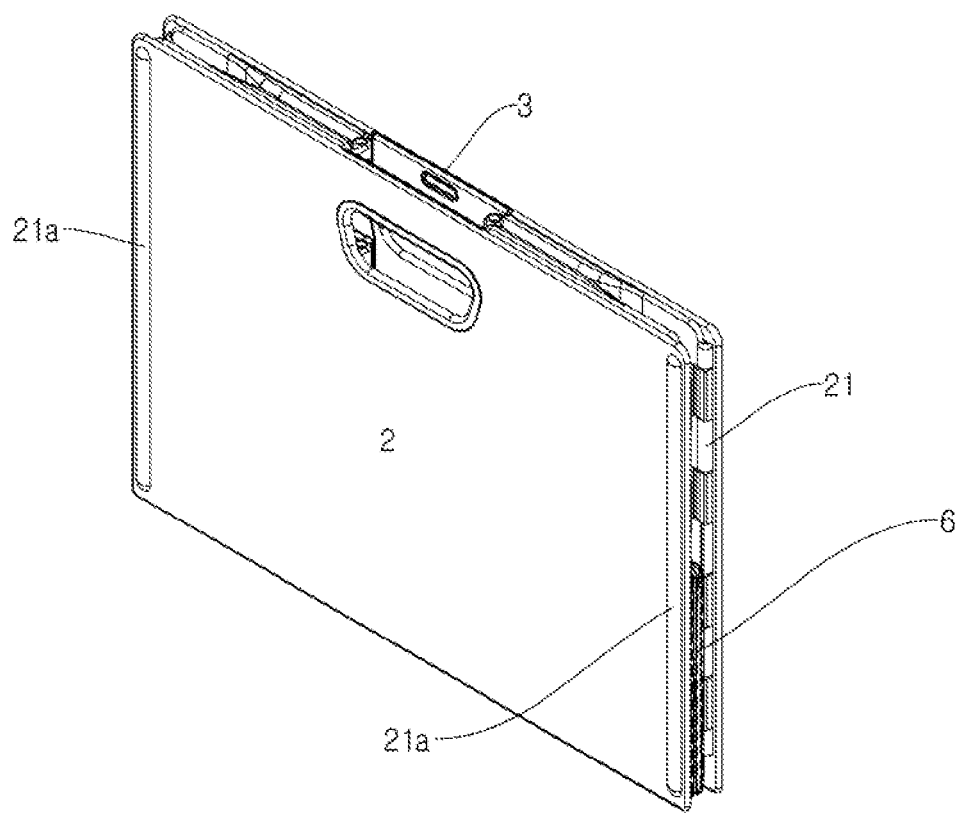
FIGS. 6 and 7 are perspective views showing states in which the folding box according to the embodiment of the present invention is folded.
Figure 7:
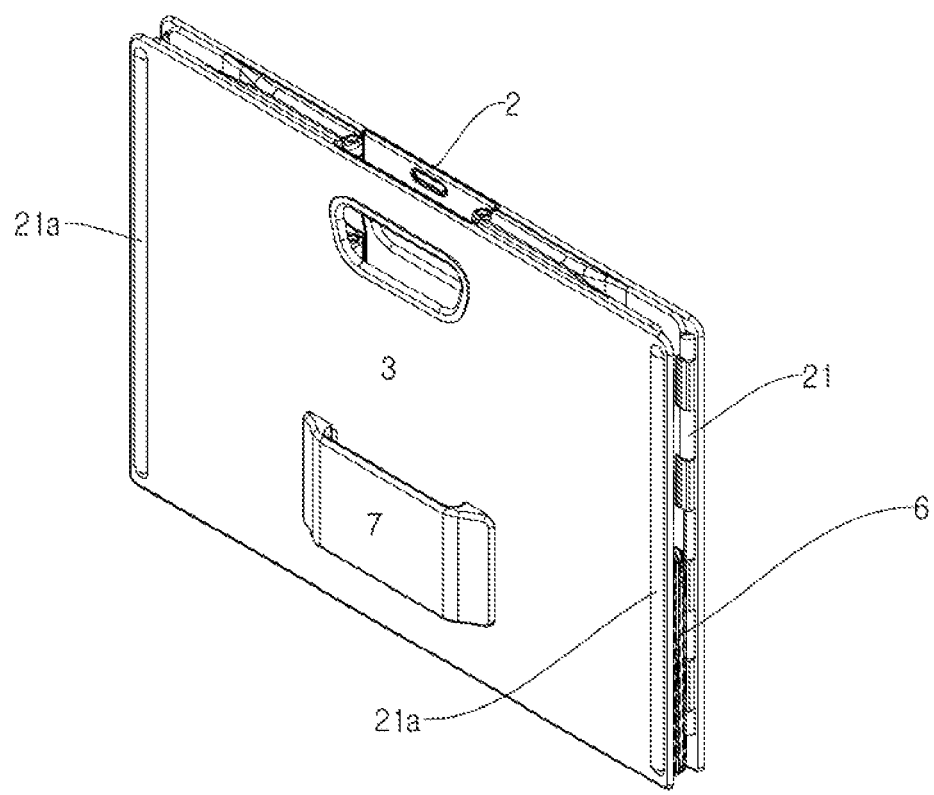
Figure 8:
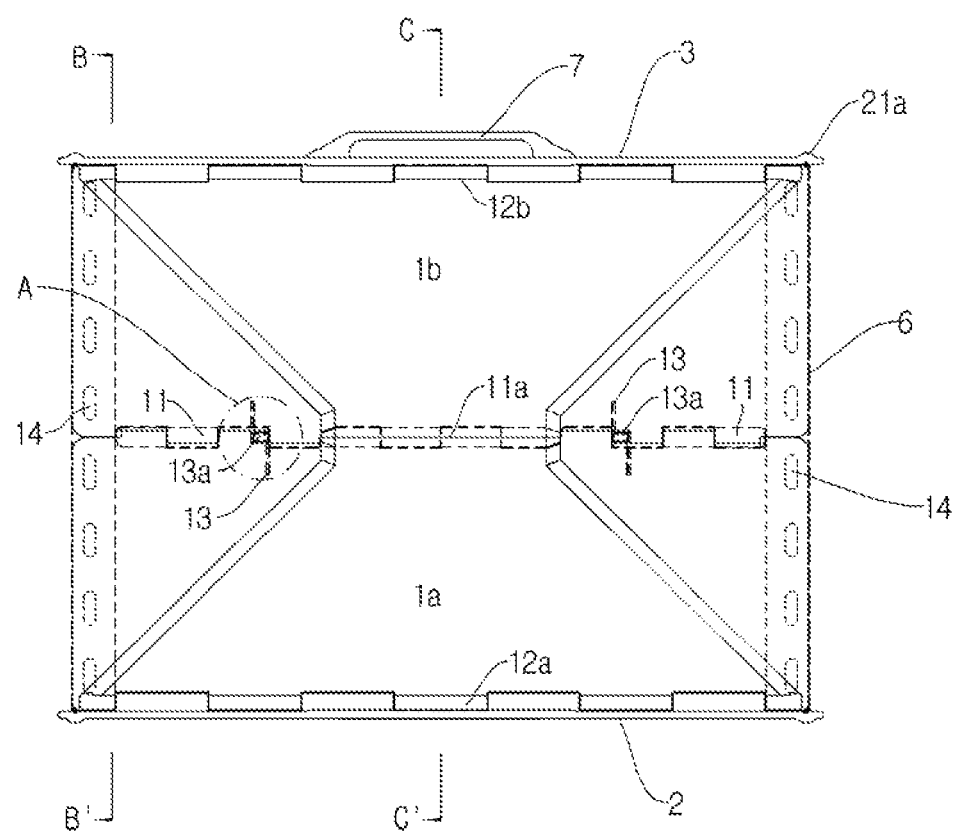
FIG. 8 is a plane view showing a configuration of the folding box according to the embodiment of the present invention.
Figure 9:
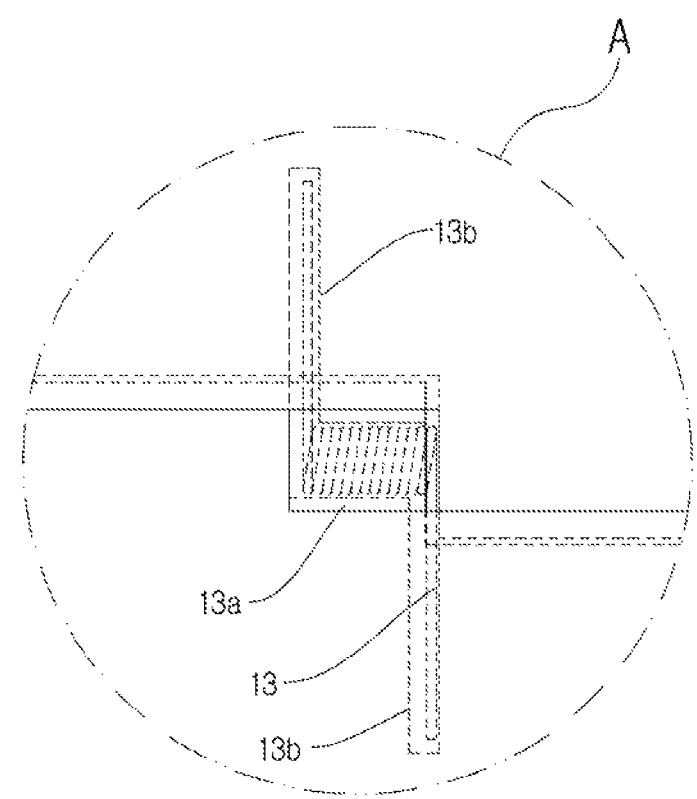
FIG. 9 is an enlarged view showing portion A in FIG. 8.
Figure 10:
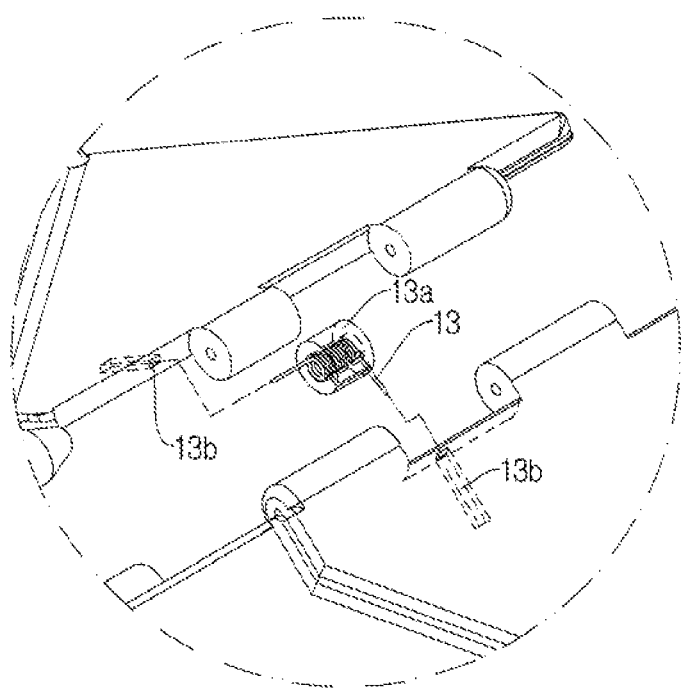
FIG. 10 is a perspective view of FIG. 9.
Figure 11:
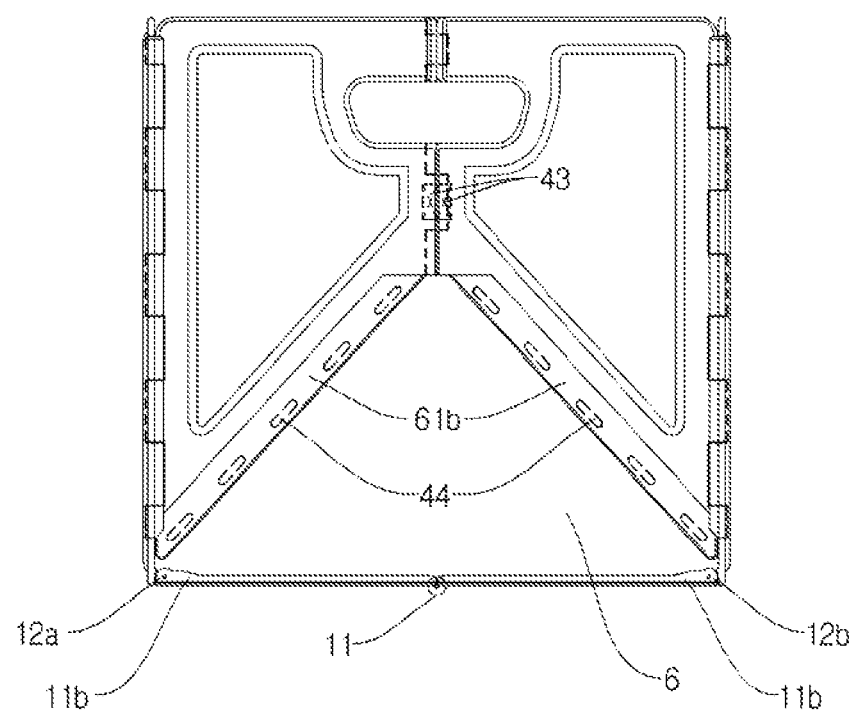
FIG. 11 is a sectional view taken along line B-B' of FIG. 8.
Figure 12:
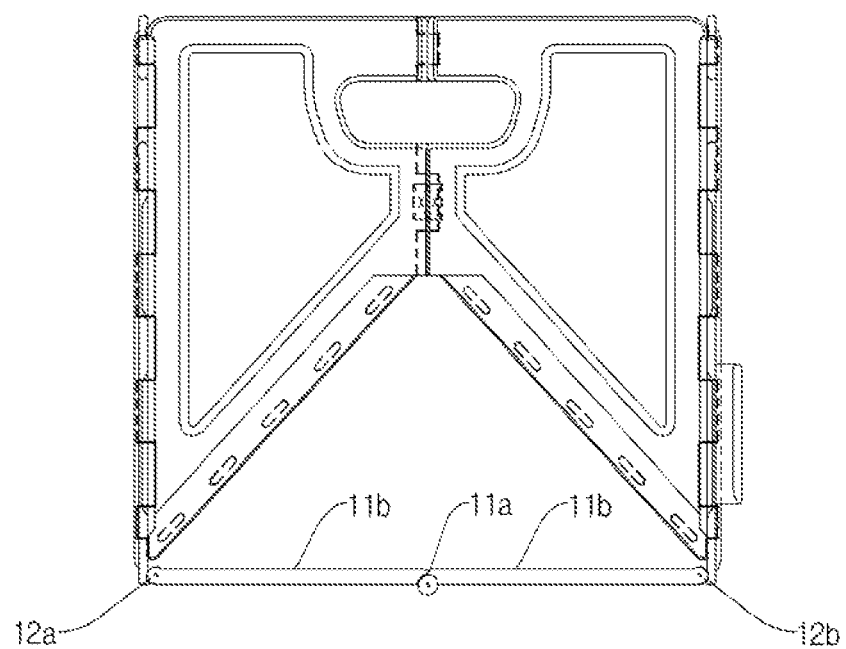
FIG. 12 is a sectional view taken along line C-C' of FIG. 8.

FIGS. 1 to 3 are perspective views showing a folding box according to an embodiment of the present invention, FIG. 4 is an exploded perspective view showing the folding box according to the embodiment of the present invention, FIG. 5 is a perspective view showing a folding process of the folding box according to the embodiment of the present invention, FIGS. 6 and 7 are perspective views showing states in which the folding box according to the embodiment of the present invention is folded, FIG. 8 is a plane view showing a configuration of the folding box according to the embodiment of the present invention, FIG. 9 is an enlarged view showing portion A in FIG. 8, FIG. 10 is a perspective view of FIG. 9, FIG. 11 is a sectional view taken along line B-B' of FIG. 8, FIG. 12 is a sectional view taken along line C-C' of FIG. 8, and FIGS. 13 to 15 are perspective views showing folding boxes according to further embodiments of the present invention.

Referring to FIGS. 1 to 15, the folding box according to the embodiment of the present invention includes: a bottom part 1 folded inward by at least one bottom folding means 11; a front side part 2 connected to a front side of the bottom part 1; a rear side part 3 connected to a rear side of the bottom part 1; a left side part 4 connected to a left side of the bottom part 1 and folded inward by at least one left folding means 41; and a right side part 5 connected to a right side of the bottom part 1 and folded inward by at least one right folding means 51, Each of the left side part 4 and the right side part 5 have a soft-flexible side part 6 which is located at a lower area of folding means 41 and 51 on left and right sides, and both flexible side parts 6 allow the bottom part 1 to be folded inward when the left side part 4 and the right side part 5 are folded inward.

According to the embodiment of the present invention, the folding box is formed in a hard cuboid shape with an open top and has a space in which items may be stored. In addition, the folding box of the present invention may be made of synthetic resin of a hard material (a rigid material) such as poly propylene (PP), poly carbonate (PC), or acrylonitrile butadiene styrene copolymer for protecting inner stored items, but is not limited to the materials.

However, the flexible side part 6 may be made of a soft material such as fabrics or synthetic fabrics. That is, the flexible side part 6 is made of the soft material so that the bottom part 1 can be folded inward when the left side part 4 and the right side part 5 are folded.

In the folding box according to the embodiment of the present invention, the left side part 4 may have a first left side panel 4a and a second left side panel 4b that are connected to each other by the left folding means 41 and folded inward. The right side part 5 may have a first right side panel 5a and a second right side panel 5b that are connected to each other by the right folding means 51 and folded inward. In addition, the bottom part 1 may have a first bottom panel 1a and a second bottom panel 1b that are connected to each other by the bottom folding means 11 and folded inward by the flexible side part 6 at the same time when the left side part 4 and the right side part 5 are folded inward.

In addition, in the folding box according to the embodiment of the present invention, the bottom folding means 11, the left folding means 41, and the right folding means 51 may be configured as hinges.

Here, when the hinges are used as the bottom folding means 11, the left folding means 41, and the right folding means 51, hinge pins are inserted in the hinges.

In addition, according to embodying the present invention, each of the bottom folding means 11, the left folding means 41, and the right folding means 51 may be provided with two or more folding means. In this case, in response to the bottom folding means 11, the left folding means 41, and the right folding means 51, it is preferable that three or more bottom parts 1, left side parts 4, and right side parts 5 are provided. Further, since length of the folding box in a front-rear direction may be formed long, more items may be stored inside the folding box.

In addition, the bottom part 1 and the front side part 2 are connected to each other vertically by a first connection part 12a, and the bottom part 1 and the rear side part 3 are connected to each other vertically by a second connection part 12b. Thus, the bottom part 1 can be folded inward and unfolded.

Here, the first connection part 12a and second connection part 12b may be configured as hinges like the bottom folding means 11, the left folding means 41, and the right folding means 51.

In addition, the front side part 2 and the left side part 4 are connected to each other at a right angle by an edge connection part 21, in the same way, the front side part 2 and the right side part 5, the rear side part 3 and the left side part 4, and the rear side part 3 and the right side part 5 are also connected. Therefore, the left side part 4 and the right side part 5 can be folded inward and unfolded.

The edge connection part 21 may be configured as a hinge like the bottom folding means 11, the left folding means 41, and the right folding means 51.

Further, when the edge connection part 21 is the hinge, in order to protect the edge connection part 21 and increase strength thereof, an edge lid 21a may be coupled by covering around the edge connection part 21 in a front or rear direction of the folding box.

Referring to FIG. 1, a front handle 22 and a rear handle 32 may be formed on the front side part 2 and the rear side part 3, respectively.

In addition, a left side handle 42 and a right side handle 52 may be formed on the left side part 4 and the right side part 5, respectively. Therefore, the folding box of the present invention can be easily transported.

In addition, the left side handle 42 and the right side handle 52 may have a left handle reinforcement part 41d and a right handle reinforcement part 51d around the left side handle 42 and the right side handle 52 for protecting the left side handle 42 and the right side handle 52 and increasing strength thereof.

Further, a connection holder 7 may be provided on the rear side part 3. By using the connection holder 7, the folding box of the present invention can be easily moved by being coupled to a portable cart or a trolley.

Referring to FIGS. 4 and 11, in the folding box according to the embodiment of the present invention, the left folding means 41 and the right folding means 51 may be provided with a left hinge magnet 43 and a right hinge magnet 53, respectively, for increasing structural force in a state in which the left side part 4 and the right side part 5 are unfolded.

The left folding means 41 may include a first left hinge 41a and a second left hinge 41b. Specifically, the first left hinge 41a may be positioned on a lower side of the left handle 42 and the second left hinge 41b may be positioned on an upper side thereof.

In addition, since the left hinge magnet is provided on the first left hinge 41a or the second left hinge 41b, the structural force between the first left side panel 4a and the second left side panel 4b can be increased when the left side part 4 is unfolded.

A first left hinge reinforcement part 41c and a second left hinge reinforcement part 41e may be provided around the first left hinge 41a and the second left hinge 41b so as to protect first left hinge 41a and the second left hinge 41b and increase strength thereof.

Further, each of the first left side panel 4a and the second left side panel 4b may have a left edge reinforcement part 41f on an upper end thereof. Therefore, when the left handle 42 is gripped, it is possible to protect the first left side panel 4a and the second left side panel 4b and to increase strength thereof.

The right folding means 51 may include a first right hinge 51a and a second right hinge 51b. Specifically, the first right hinge 51a may be positioned on a lower side of the right handle and the second right hinge 51b may be positioned on an upper side thereof.

In addition, since a right hinge magnet 53 is provided on the first right hinge 51a or the second right hinge 51b, structural force between the first right side panel 5a and the second right side panel 5b can be increased when the right side part 5 is unfolded.

A first right hinge reinforcement part 51c and a second right hinge reinforcement part 51e may be provided around the first right hinge 51a and the second right hinge 51b so as to protect the first right hinge 51a and the second right hinge 51b and increase strength thereof.

Further, each of the first right side panel 5a and the second right side panel 5b may have a right edge reinforcement part 51f on an upper end thereof. Therefore, when the right handle 52 is gripped, it is possible to protect the first right side panel 5a and the second right side panel 5b and to increase strength thereof.

Referring to FIGS. 9 and 10, in the folding box according to the embodiment of the present invention, the bottom folding means 11 may have a bottom hinge spring 13 and a spring case 13a for providing elastic force to the bottom folding means 11 when the bottom part 1 is folded inward.

Specifically, the spring case 13a is provided to cover the bottom hinge spring 13. In addition, both ends of the bottom hinge spring 13 are inserted in spring holes 13b that are respectively provided in the first bottom panel 1a and the second bottom panel 1b, thereby protecting the hinge spring 13 without being exposed to the outside.

Accordingly, in this case of the present invention, when the bottom part 1 is unfolded, a predetermined force for allowing the bottom part 1 to be folded inward is generated by the elastic force of the bottom hinge spring 13. Thus, when the left side part 4 and the right side part 5 are folded inward, the bottom part 1 can be easily folded inward at the same time.

In addition, a bottom reinforcement part 11b may be provided on upper surface of each of the first bottom panel 1a and the second bottom panel 1b to protect the first bottom panel 1a and the second bottom panel 1b and increase strength thereof, as shown in FIG. 12. That is, at a state in which the folding box is folded, overall thickness of the folding box may be maintained due to the bottom reinforcement part 11*b* being positioned between the left side part 4 and the right side part 5, and strength of the bottom part 1 can be increased through the bottom reinforcement part 11*b*.

Referring to FIGS. 8 and 12, the bottom reinforcement part 11*b* may have a bottom hinge step 11*a* contacted with the bottom folding means 11. Thus, when the items are stored in the folding box in which the bottom part 1 is unfolded, by the bottom hinge step 11*a* and tensile force of the flexible side part 6 connected to the first bottom panel 1*a* and the second bottom panel 1*b*, the first bottom panel 1*a* and the second bottom panel 1*b* may support loads of the items and can maintain a horizontal state without being folded outward.

The flexible side part 6 of the folding box according to the embodiment of the present invention is formed in a triangular shape, and the first left side panel 4*a*, the second left side panel 4*b*, the first right side panel 5*a*, and the second right side panel 5*b* may be formed in a trapezoidal shape. Specifically, the flexible side part 6 is preferably formed in the triangular shape, in which a part of an upper vertex of the triangular shape is removed, to be connected to the first left side panel 4*a* and the second left side panel 4*b*, or the first right side panel 5*a* and the second right side panel 5*b*. That is, since the flexible side part 6 is connected to the first left side panel 4*a* and the second left side panel 4*b*, or the first right side panel 5*a* and the second right side panel 5*b*, the flexible side part 6 is preferably formed in the triangular shape in which the part of the vertex of the triangular shape is cut by width of each of the left folding means 41 or the right folding means 51.

In addition, left fastening protrusions 44 and right fastening protrusions (not shown) may be respectively provided on the left side part 4 and the right side part 5, and may be fitted in fastening holes H on left and right edges of the flexible side part 6. In addition, a left fastening cover and a right fastening cover may be fastened to the left fastening protrusions 44 and the right fastening protrusions, thus the flexible side part 6 may be coupled to each of the left side part 4 and the right side part 5.

Further, a bottom fastening protrusions 14 may be provided on both ends of an under surface of the bottom part 1, and may be fitted in fastening holes H on a lower edge of the flexible side part 6. In addition, a bottom fastening cover 61*c* may be fastened to the bottom fastening protrusions 14, thus the bottom part may be coupled to the flexible side part 6.

Therefore, referring to FIGS. 5 and 6, since each of the left side part 4 and the right side part 5 have the flexible side part 6, when the left folding means 41 and the right folding means 51 are pushed inward, the left side part 4 and the right side part 5 are folded inward and the bottom part 1 is easily folded inward at the same time.

When an entire area of the left side part 4 and the right side part 5 are made of hard materials, the left side part 4, the right side part 5, and also the bottom part 1 may not be folded inward. In addition, when the flexible side part 6 provided on the left side part 4 and the right side part 5 is provided as an opened empty space, the items stored in the folding box escape from the folding box through the empty space, which is problematic. In addition, when the entire part of the folding box is made of a soft material, it is difficult to protect the items stored therein and strength of the folding box is lowered, which are problematic.

Accordingly, as the folding box of the present invention has the flexible side part 6 that is soft, flexible, and triangular shaped on the left side part 4 and the right side part 5, the above-mentioned problems can be solved and convenience of the folding box can be maximized because it is easy to fold and unfold the box.

Figure 13:
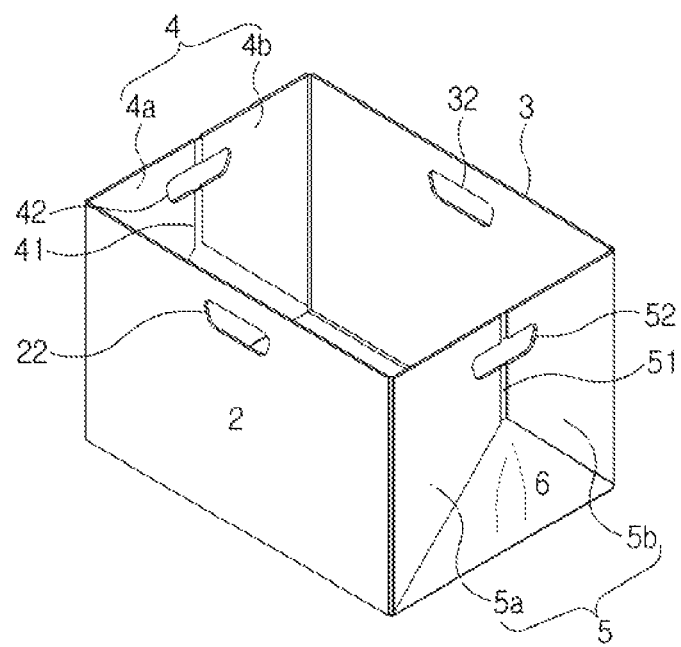

Referring to FIG. 13, according to another embodiment of the present invention, a bottom part 1, a front side part 2, a rear side part 3, a left side part 4, and a right side part 5 may be connected to each other by one of these methods such as adhesion, welding, fastening, and injection methods. Likewise, a bottom folding means 11, a left folding means 41, and a right folding means 51 may be provided so that a first bottom panel 1*a* and a second bottom panel 1*b*, a first left side panel 4*a* and a second left side panel 4*b*, and a first right side panel 5*a* and a second right side panel 5*b* can be folded inward in a state of being connected by one of the above-mentioned methods, such as adhesion, welding, fastening, and injection methods. Thus, when external force is applied to the bottom folding means 11, the left folding means 41, and the right folding means 51, a bottom part 1, a left side part 4, and a right side part 5 are folded inward together.

Figure 14:
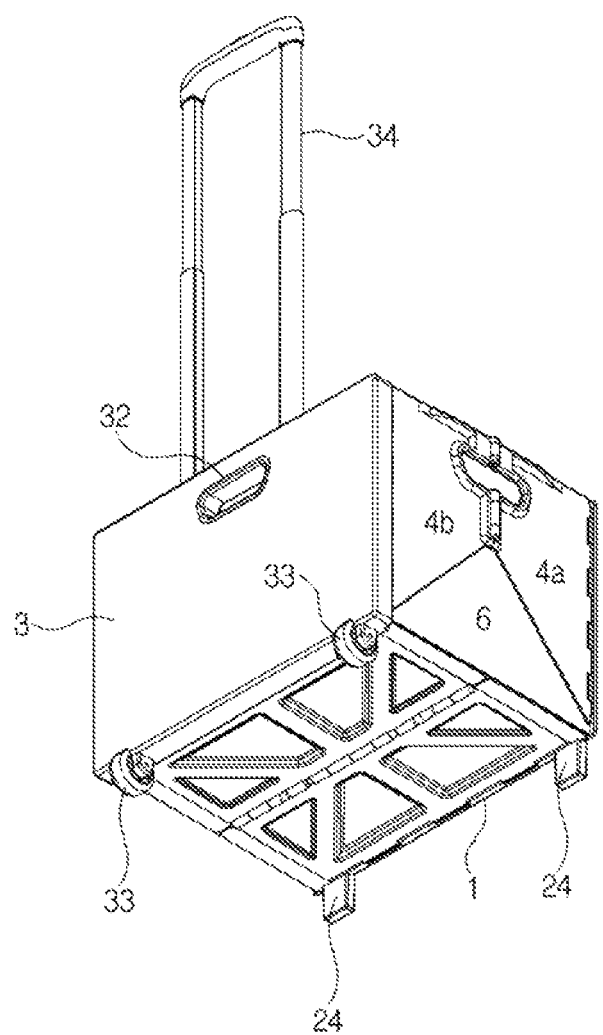

Additionally, referring to FIG. 14, according to another embodiment of the present invention, one or more rear wheels 33 for moving the folding box may be provided in a protruding shape at a lower side of a rear side part 3 toward the ground. When the folding box is provided with the rear wheels 33, a front supporter 24 may be provided in a protruding shape at a lower side of a front side part 2 and an opposed side corresponding to the rear wheels 33. Thus, when the folding box is stationary, the folding box can stay in a stable horizontal state with the ground.

In addition, referring to FIG. 15, according to still another embodiment of the present invention, when the rear wheels are provided at a lower side of a rear side part 3, one or more front wheels for moving the folding box may be provided at a lower side of a front side part 2. These front wheels 23 may be provided in the protruding shape toward the ground at an opposite side corresponding to the rear wheels 33.

Further, depending on surrounding usage environment and preference of the user, when the rear wheels 33 are provided on the rear side part 3 of the folding box of the present invention, or when the front wheels 23 and the rear wheels 33 are respectively provided together on the front side part 2 and the rear side part 3, a portable handle 34 that is gripped by the user is provided on a side of the rear side part 3. Thus, the user can conveniently move the folding box with the stored items by using the portable handle 34.

Additionally, the folding box of the present invention may have a cover (not shown) for covering an upper surface of the folding box. By the cover, the items stored in the folding box can be protected.

Although a preferred embodiment of the present invention has been described for illustrative purposes, those skilled in the art will appreciate that various modifications, additions and substitutions are possible, without departing from the scope and spirit of the invention as disclosed in the accompanying claims.

We claim:
1. A foldable box comprising:
    a bottom part folded inwardly by at least one bottom folding hinge, said bottom part comprising at least one first bottom plate and second bottom plate that are connected to each other by the bottom folding hinge;
    a front side part connected to a front side of said bottom part;
    a rear side part connected to a rear side of said bottom part;

a rigid left side part connected to a left side of said bottom part and folded inwardly by at least one left side folding hinge; and a rigid right side part connected to a right side of said bottom part and folded inwardly by at least one right side folding hinge, wherein said left side part and said right side part each have a flexible side part formed of a non-rigid material, said left side part and said right side part being positioned at a lower area of the left and right side folding hinges respectively, wherein when said left side part and said right side part are folded inwardly and the first bottom plate and the second bottom plate are folded inwardly at the same time, opposite side surfaces of each of the first and second bottom plates are folded inwardly while contacting the flexible side part so as to not interfere with a path to which said left side part and said right side part are folded inwardly.

2. The folding box of claim 1, wherein said left side part has a first left side panel and a second left side panel that are connected to each other by the left folding hinge and folded inward, wherein said right side part has a first right side panel and a second right side panel that are connected to each other by the right folding hinge and folded inward.

3. The folding box of claim 2, wherein the first left side panel, the second left side panel, the first right side panel, and the second side panel are of a trapezoidal shape.

4. The folding box of claim 1, wherein one or more rear wheels are affixed to a lower side of the rear side part.

5. The folding box of claim 4, wherein one or more front wheels are affixed to the lower side of the front side part.

6. A folding box comprising:
a bottom part folded inwardly by at least one bottom folding hinge;
a front side part connected to a front side of the bottom part;
a rear side part connected to a rear side of the bottom part;
a left side part connected to a left side of the bottom part and folded inwardly by at least one left folding hinge;
a right side part connected to a right side of the bottom part and folded inwardly by at least one right folding hinge, wherein the left side part and the right side part each have a flexible side part formed of a soft material located at a lower area of left folding hinge and the right folding hinge respectively so as to allow the bottom part to be folded inwardly when the left side part and the right side part are folded inward, wherein the left folding hinge has a left hinge magnet and the right folding hinge has a right hinge magnet.

7. A folding box comprising:
a bottom part folded inwardly by at least one bottom folding hinge;
a front side part connected to a front side of the bottom part;
a rear side part connected to a rear side of the bottom part;
a left side part connected to a left side of the bottom part and folded inwardly by at least one left folding hinge;
a right side part connected to a right side of the bottom part and folded inwardly by at least one right folding hinge, wherein the left side part and the right side part each have a flexible side part formed of a soft material located at a lower area of left folding hinge and the right folding hinge respectively so as to allow the bottom part to be folded inwardly when the left side part and the right side part are folded inward, wherein the bottom folding hinge has a bottom hinge spring and a spring case so as to provide an elastic force to the bottom folding hinge when the bottom part is folded inwardly.

* * * * *